United States Patent
Hudson

[11] Patent Number: 6,069,653
[45] Date of Patent: May 30, 2000

[54] SECURITY CONTROL SYSTEM AND METHOD OF OPERATION

[75] Inventor: John Hudson, Farnborough, United Kingdom

[73] Assignee: Sony United Kingdom Limited, Weybridge, United Kingdom

[21] Appl. No.: 09/153,282

[22] Filed: Sep. 15, 1998

[30] Foreign Application Priority Data

Sep. 17, 1997 [GB] United Kingdom .................... 9719800

[51] Int. Cl.$^7$ ...................................................... H04N 7/18
[52] U.S. Cl. ........................ 348/143; 358/423; 386/112; 386/109; 364/514; 340/500; 340/825
[58] Field of Search ..................................... 348/143, 153, 348/154; 364/550; 358/108

[56] References Cited

U.S. PATENT DOCUMENTS

| | | | |
|---|---|---|---|
| 5,481,297 | 1/1996 | Cash et al. | 348/13 |
| 5,491,511 | 2/1996 | Odle | 348/153 |
| 5,517,236 | 5/1996 | Sergeant et al. | 348/143 |
| 5,583,796 | 12/1996 | Reese | 364/550 |
| 5,625,410 | 4/1997 | Washino et al. | 348/154 |
| 5,724,475 | 3/1998 | Kirsten | 386/109 |

Primary Examiner—Howard Britton
Assistant Examiner—Shawn S. An
Attorney, Agent, or Firm—Frommer Lawrence & Haug, LLP.; William S. Frommer; Dennis M. Smid

[57] ABSTRACT

The present invention provides a security control system, comprising a system controller (2) arranged to receive video signals from a plurality of video sources, and to selectively output a subset of the received video signals for display on a display means, and a display controller (10, 12) arranged to receive the subset of video signals output by the system controller, and to process those signals to generate images for display on the display means. In accordance with the present invention, the system controller (2) is further arranged to receive alarm signals, each alarm signal being associated with a video source, the system controller (2) being responsive to receipt of an alarm signal to output the video signal of the associated video source to the display controller. The display controller (10, 12) is then arranged to cause any images generated from video signals associated with alarm signals to be displayed in a predetermined area (M11) of the display means.

By ensuring that all of the video information associated with alarms is displayed in a predefined area, it is easier for the operator to review that video information in order to ensure that effective action is taken in response to the alarm condition(s).

12 Claims, 6 Drawing Sheets

SECURITY CONTROL SYSTEM AND METHOD OF OPERATION

BACKGROUND OF THE INVENTION

1. Field of the Invention

The present invention relates to a security control system and method of operation of such a security control system. Illustrative embodiments of the invention relate to a security system comprising video cameras, the control system, and monitors for displaying images received by the cameras.

2. Description of the Prior Art

Security CCTV systems are now finding widespread use in monitoring shopping centres, town centres, and commercial and industrial buildings.

The size of these systems may vary from one or two video sources for small retail outlets, petrol stations etc., to large town centre installations which may have greater than a hundred video sources with hundreds of alarm input signals.

In large installations, a great deal of security information is provided to the operator for evaluation. Such large security systems are typically managed by a system controller which can: provide access to a large number of video sources (for example a hundred video sources) and many hundreds of alarm signals; allow control of pan and tilt heads for each camera; provide some control panels (e.g. ten or fewer control panels) for enabling an operator to interact with the system; and present video information on some (e.g. thirty or more) video monitors.

Managing this information to ensure that any incident may be efficiently and effectively identified, dealt with and recorded for evidential purposes can be very operator intensive.

To improve the efficiency of the monitoring process, large security sites are often partitioned or broken down into areas, with one operator assigned responsibility for monitoring each area.

System controllers may provide the facilities to effectively partition an installation into a number of (e.g. eight) fully functioning sub-systems. Each sub-system has a control interface, a number of video monitors, and access to a sub-set of the video sources and alarm information from the complete installation.

The monitors are watched by operators who use the control panels, e.g. in response to alarms, to control the views presented by the cameras in order to determine the cause of an alarm. Even by assigning one operator to each partition of an installation, an event may trigger many alarms and present the operator with an overwhelming amount of alarm and video information.

Consider by way of example a CCTV security system having 128 video sources, e.g. cameras, and 32 video display monitors, and being able to support up to 768 individual alarm signal inputs.

The problem with such a large number of video sources and video display monitors is that it becomes very difficult for security operators to effectively monitor all of the video information provided. Further, since there are potentially a large number of alarm signals that can be generated, then there is a need for techniques which will enable those large number of alarm inputs to be effectively managed. Even if a system could be provided which associated particular alarm signals with particular video images, it is still clear that if a large number of alarms are detected by the system, then a great deal of video information may be presented to the operator. Further, this video information may be dispersed over a large number of video display monitors, since different display monitors will typically be arranged to display images from particular video sources.

It is important that the operator must review all of the information provided to ensure that effective action is taken in response to any alarm condition(s). Particularly in large security systems having a large number of video sources and video display monitors, it is possible that some important information may be missed due to the operator having to review information dispersed over a large number of display monitors.

It is hence an object of the present invention to provide a security control system which processes the images associated with active alarm signals in a manner which facilitates a more effective analysis of the information generated by the security control system as a result of those alarm signals.

SUMMARY OF THE INVENTION

Accordingly, the present invention provides a security control system, comprising: a system controller arranged to receive video signals from a plurality of video sources, and to selectively output a subset of the received video signals for display on a display means; a display controller arranged to receive the subset of video signals output by the system controller, and to process those signals to generate images for display on the display means; the system controller further being arranged to receive alarm signals, each alarm signal being associated with a video source, the system controller being responsive to receipt of an alarm signal to output the video signal of the associated video source to the display controller; the display controller being arranged to cause any images generated from video signals associated with alarm signals to be displayed in a predetermined area of the display means.

In accordance with the present invention, the system controller is arranged upon receipt of alarm signals to output to a display controller those video signals being generated by video sources associated with the alarm signals. The display controller is then arranged to cause any images generated from such video signals to be displayed in a predetermined area of the display means. By ensuring that all of the video information associated with alarms is displayed in a predefined area, it is easier for the operator to review that video information in order to ensure that effective action is taken in response to the alarm condition(s).

The display means may take any appropriate form. For example, it may take the form of a single, large display area upon which a number of images from separate video sources can be displayed simultaneously, for example as an array of images, and/or in a picture-in-picture (PIP) format. However, in preferred embodiments, the display means comprises of plurality of display devices, and the predetermined area of the display means is a predetermined one of said display devices. Hence, in accordance with preferred embodiments, upon receipt of one or more alarm signals, the images from the video sources associated with those alarm signals will all be displayed on a single display device, thereby facilitating appraisal of the situation by an operator.

It will be apparent that there are a number of different ways in which the various images associated with alarm signals may be displayed within the predetermined area of the display means. For example, the images may be displayed sequentially one after the other, each image being displayed for a predetermined amount of time. However, in preferred embodiments, the display controller is arranged to scale the images generated from the video signals associated with alarm signals dependent on the number of such video signals, such that those images can be displayed simultaneously within the predetermined area of the display means. It has been found that an operator can more efficiently determine what action to be taken in response to alarm conditions if he/she is able to review a number of relevant images simultaneously.

In accordance with the above described preferred embodiment, if there is only one video source associated with the alarm signal(s) received by the system controller, then the image associated with that video source will preferably be displayed by the display controller using the full display area of the predetermined area of the display means. However, if the alarm signals are associated with more than one video source, then the images from those video sources will be scaled in order to fit all of the images simultaneously within the predetermined area of the display means. Hence, if four images are to be displayed, the display area may be divided into four equal regions, with one image displayed in each region.

Whilst this approach works well when there are a relatively small number of images to be displayed, it will be apparent that, as the number of images to be displayed increases, so the size of each image scaled by the display controller will become smaller. At some point, it will be apparent that the size of the images will be reduced to such an extent that it is difficult for the operator to deduce the necessary information from those images. Hence, in preferred embodiments, the display controller is arranged to display simultaneously up to a predetermined maximum number of images generated from the video signals associated with alarm signals. Hence, as an example, if the predetermined maximum number is eight, and twelve images are associated with current alarm signals, then only eight of those images will be displayed simultaneously.

In preferred embodiments, if the number of images generated from the video signals associated with alarm signals exceeds the predetermined maximum number, then the excess images are displayed in the predetermined area when alarm conditions associated with previously displayed images are cleared by an operator. The relationship between "alarm conditions" and "alarm signals" is as follows. When an alarm is raised, for example, by a movement detector detecting movement within an unoccupied area, then an alarm signal is generated and input to the system controller of the security control system. The receipt of the alarm signal generates an alarm condition within the security control system, which causes the image associated with the alarm condition to be displayed. When an operator has noted any particular alarm condition, he/she can clear that alarm condition, which will cause the image associated with that alarm condition to be removed from the predetermined area of the display means. This action does not in itself remove the alarm signal, the alarm signal only being removed by sending a reset signal to the device generating that alarm signal. However, the alarm condition associated with that alarm signal will not be re-triggered until that alarm signal has been reset. In preferred embodiments, a permanent record of all alarm signals generated is kept, even after an operator has cleared particular alarm conditions.

In preferred embodiments, the images generated from video signals associated with alarm signals may be displayed in a picture-in-picture format within the predetermined area of the display means. For example, if the alarm signals received by the security control system are associated with two video sources, and hence two images are to be displayed in the predetermined area of the display means, then one of these images can be displayed within the other image. However, in preferred embodiments, as the number of images to be displayed increases, then the images generated from video signals associated with alarm signals are preferably displayed as an array within the predetermined area of the display means.

In addition to displaying any images associated with alarm signals within a predetermined area of the display means, in preferred embodiments, a visual indication is also associated with each displayed image generated from video signals associated with alarm signals to indicate to an operator that those images are associated with alarm signals. Prior to the receipt of any alarms by the security control system, the predetermined area of the display means may be used to display any images originating from any of the video sources. Hence, when one or more alarm signals are subsequently received, and hence the predetermined area of the display means becomes dedicated to the display of images associated with alarm signals, then the visual indication associated with each displayed image can help direct the operators attention to the predetermined area of the display means, and indicate that the predetermined area of the display means is now being used in an alarm mode of operation.

It will be apparent to those skilled in the art that the visual indication can take any appropriate form. However, in preferred embodiments, a border of each displayed image associated with alarm signals is highlighted to provide the visual indication. Preferably, the highlighted border takes the form of a flashing border, for example a red flashing border.

In preferred embodiments, the system controller includes a storage for identifying the video source associated with each alarm signal, and the system controller is arranged to reference this storage upon receipt of an alarm signal to determine which video signal to output to the display controller. Preferably, this storage takes the form of a look-up table, which associates each alarm signal with a particular video source. In preferred embodiments, the number of alarm signal inputs to the control system exceeds the number of video sources, and at least one of said video sources is associated with a plurality of alarm signal inputs.

Further, in preferred embodiments, at least one of the video sources is connected to a mechanism for moving the video source relative to a surface on which it is mounted, and the system controller is responsive to specific alarm signals to output signals to the mechanism in order to move the at least one video source in a predetermined manner. Hence, if a camera is being used to monitor a particular room, then the occurrence of a specific set of alarm signals, for example alarm signals generated from a particular area of the room, may cause the system controller to output signals to the mechanism in order to move the video source such that it displays an image from that particular area of the room. The mechanism may, for example, be a pan and tilt head, and the system controller can be arranged to issue control signals to the pan and tilt head in order to move the video source as appropriate. Hence, in preferred embodiments, the security control system can automatically move, zoom and focus a camera and display the result of a video image on a monitor in response to the detection of one or more alarm signals. This further enhances the information made available to the operator, and hence assists the operator to take effective action in response to the alarm condition(s).

Viewed from a second aspect, the present invention provides a method of operating a security control system, comprising the steps of: (a) receiving video signals from a plurality of video sources; (b) selectively outputting a subset of the received video signals for display on a display means; (c) processing the signals output at said step (b) to generate images for display on the display means; (d) receiving alarm signals, each alarm signal being associated with a video source; (e) responsive to receipt of an alarm signal, outputting at said step (b) the video signal of the associated video source; and (f) arranging any images generated at said step (c) from video signals associated with alarm signals to be displayed in a predetermined area of the display means.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
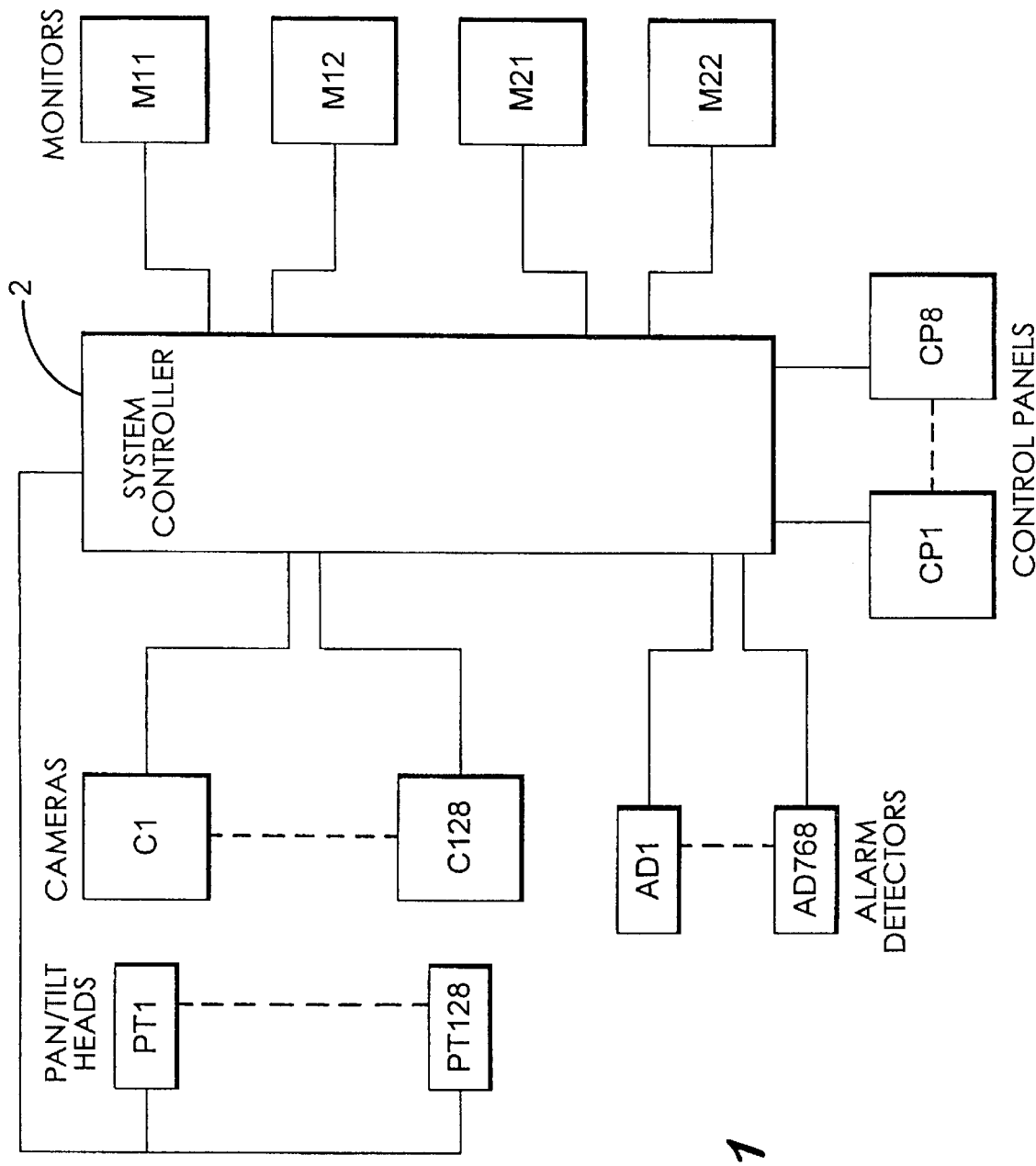
FIG. 1 is a schematic block diagram of an illustrative security system in which aspects of the present invention are implemented.

Referring to FIG. 1 an illustrative security system in accordance with preferred embodiments of the present invention comprises 128 cameras C1–C128. At least some, and in this example all, of the cameras have pan and tilt heads PT1–PT128. The system also comprises 768 alarm detectors AD1–AD768. One or more video cassette recorders (VCRs) may also be provided for recording the video signals produced by the cameras.

A system controller 2 receives analogue video from the cameras C1–C128, and alarm signals from the alarm detectors AD1–AD768. The controller 2 provides control signals to the pan and tilt heads.

Up to eight control panels CP1 to CP8 are provided. The control panels CP1–CP8 are used to program the system controller 2 and also are used by operators to control the system in use.

The controller 2 controls in accordance with its programming the display of video from the cameras, and the display of alarms, on four monitors M11, M12, M21, M22.

Figure 2:
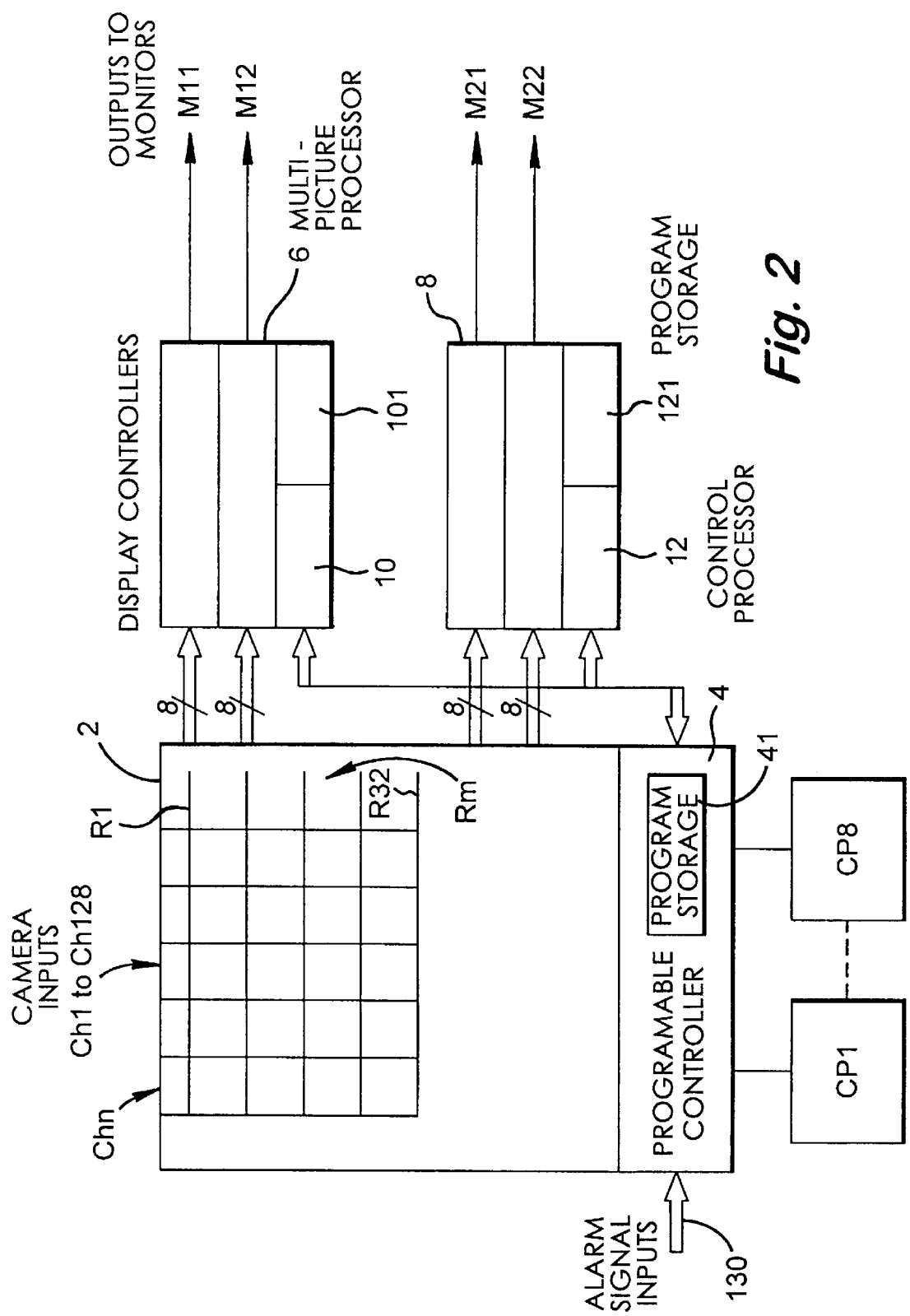
FIG. 2 is a more detailed block diagram of the system controller of the system of FIG. 1.

Referring to FIG. 2, the system controller 2 comprises a video switcher having 128 analogue video inputs and 32 analogue video outputs. The inputs are shown as (vertical) columns Chn, Ch1–Ch128 in FIG. 2, and the outputs as horizontal rows Rm, R1–R32. Video switches are controlled by a programmable controller 4, e.g a special purpose data processor or computer including program storage means 41 to connect the columns Chn to the rows Rm in any desired configuration. In addition, the connections may be variable in time.

The 32 outputs R1 to R32 are organised into four groups of eight outputs. One pair of groups, or 16 outputs, feed analogue video to a first multi-picture processor 6 and the other pair of groups, or 16 outputs, feed analogue video to a second multi-picture processor 8.

Each multi-picture processor 6, 8, comprises two identical channels, both controlled by a common control processor 10, 12 having a program storage means 101, 121. Each channel processes one group of eight analogue video outputs Ri to Ri+7 e.g. R1–R8.

The monitors M11, M12 are controlled by the two channels respectively of processor 6 and the monitors M21 and M22 are controlled by the two channels respectively of processor 8.

The control processors 10, 12 are linked to the programmable controller 4 to control the display of information on the monitors in accordance with the programming of the controller 4. Programming of the controller 4 correspondingly programs the control processors 10 and 12.

Figure 3:
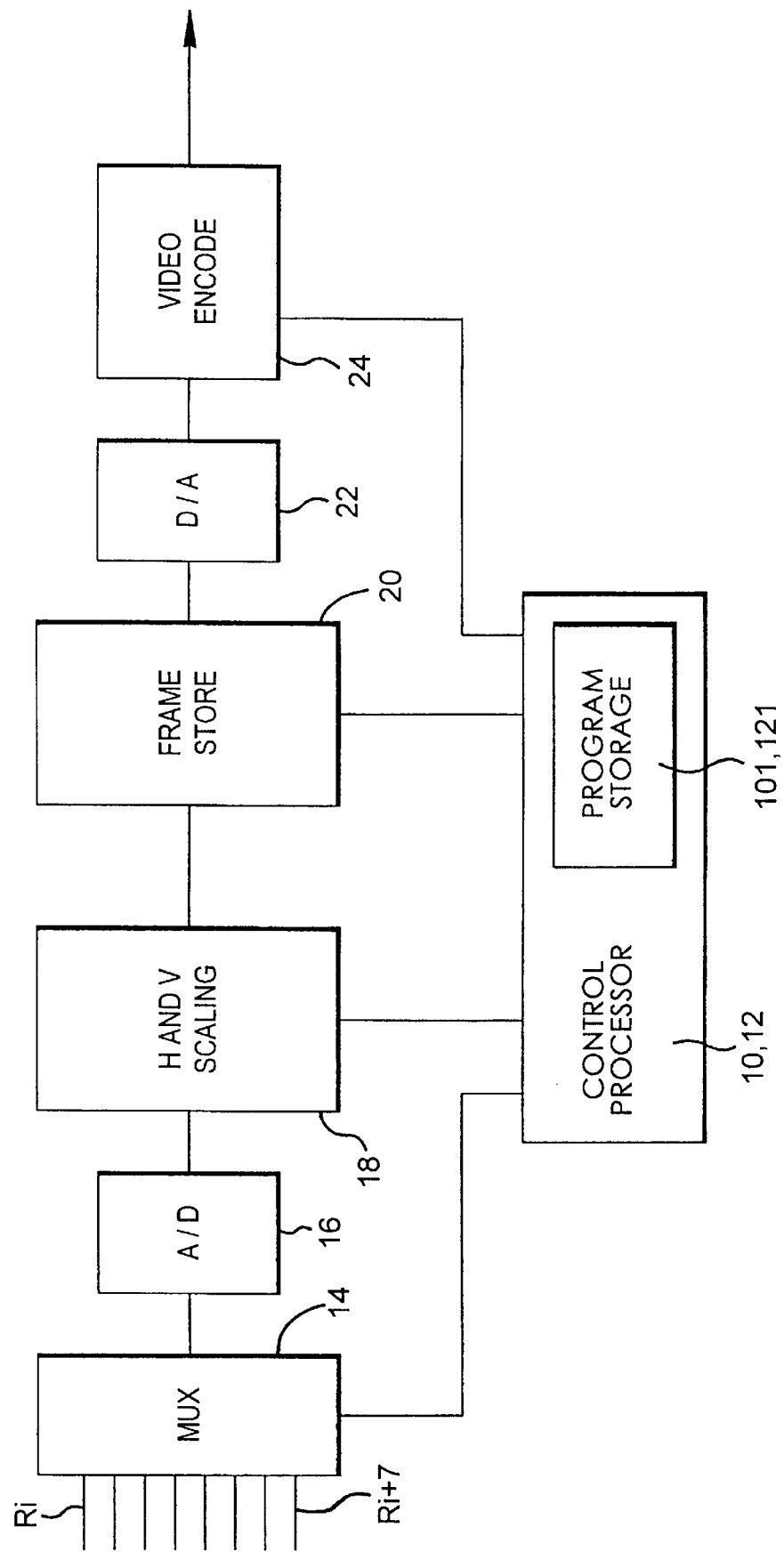
FIG. 3 is a schematic block diagram of a video signal processing channel associated with one monitor of the system of FIGS. 1 and 2.

Referring to FIG. 3, each channel of the multi-picture processors comprises a multiplexer 14 having eight input channels corresponding to one group of video inputs Ri–Ri+7 and one output. The multiplexer 14 is controlled by the control processor 10, 12 to feed any selectable one of the inputs Ri–Ri+7 to an analogue to digital converter 16. The resulting digital video is fed to a circuit 18 which under the control of the processor 10, 12 scales the video horizontally and vertically to produce an image of desired size (e.g. full screen, ¼ size, ⅛ size).

The thus scaled image is stored in a frame store 20 under the control of the processor 10, 12. The processor 10, 12 controls the write addresses of the store to position the scaled image in a desired position for display, to allow picture-in-picture displays (PIP displays) or a desired number of pictures to be displayed in an array of pictures e.g. four or eight pictures (POP displays) on one monitor, as will be described hereinbelow.

The image or images stored in the frame store 20 are read-out via a digital to analogue converter 22 to a video encoder 24. The video encoder 24 encodes the video to be compatible with the monitors M11, M12, M21, M22. The video encoder 24 may also be controlled by the processor 10, 12 to carry out other functions.

The system described herein above may operate on monochrome video signals. Alternatively colour video signals may be processed. Although the cameras produce analogue signals, the system could be modified to operate on digital signals produced by the cameras.

A preferred version of the system, as shown in FIG. 1 includes the 768 alarm detectors. The programmable controller 4 includes in its program store 41 a look-up table which is programmable to associate the cameras with one or more, e.g. a group of four, alarm detectors AD.

Hence, when an alarm signal is received over path 130 from any one of the 768 alarm detectors AD1–AD768, the programmable controller 4 of the system controller 2 is arranged to enter an alarm mode of operation. On entering this mode of operation, the programmable controller 4 references the program store 41 in order to determine which camera is associated with the particular alarm signal received over path 130.

In the alarm mode of operation, one of the monitors, for example monitor M11, will be defined as the monitor on which images relating to alarm signals are displayed. Hence, upon determining the camera associated with the received alarm signal, the programmable controller 4 will control the video switcher to route the video signal from that camera over one of the group of 8 outputs input to the first channel of the multi-picture processor 6. As discussed earlier, this channel of the multi-picture processor 6 is used to control the display of images on the monitor M11. Further, the controller 4 will send a signal to the control processor 10 within the multi-picture processor 6 to identify which of the eight inputs Ri–Ri+7 contains the video signal associated with the alarm signal. The control processor 10 will then be arranged to instruct the multiplexer 14 to output that video signal to the analogue to digital converter 16, after which the signal will be processed as previously described with reference to FIG. 3. However, the horizontal and vertical scaling performed by the circuit 18, and the position within the frame store 20 at which the image is stored will be dependent on the total number of images to be displayed relating to alarm signals. Hence, if the alarm signals received over path 130 at the system controller 2 are associated with four cameras, as determined by the programmable controller 4 with reference to the program store 41, then four video signals will be output to the first channel of the multi-picture processor 6, and the control processor 10 will receive information from the programmable controller 4 concerning which of the outputs Ri–Ri+7 contain those four video signals. Further, the control processor 10 will control the circuit 18 to perform suitable horizontal and vertical scaling on each of the four video signals to ensure that all four video signals can be displayed simultaneously on monitor M11. In addition, the control processor 10 will control the frame store 20 to ensure that each of the 4 images are displayed at predetermined positions within the display of the monitor M11.

The multi-picture processor 6 is in preferred embodiments arranged to generate multi-picture displays in any of the following formats:

full screen image, in which one image is displayed full size;

a picture-in-picture (PIP) display with a one-ninth size image inset into a full size image;

a PIP display with one one-quarter size inset image;

an array (or POP) display comprising four one-quarter size images; and an array of eight one-ninth size images.

In the normal mode of operation, any of the possible 128 video sources may be displayed in any of the screen formats. Hence, in a normal mode of operation, the multi-picture processor can be used to display video images in any of the above screen formats, or to show a sequence of previously stored screen formats.

However, when in the alarm mode of operation, the multi-picture processor 6 is arranged to only process through its first channel images associated with alarm signals, and to then display those images in any of the above screen formats on the monitor M11. Whilst in this alarm mode of operation, it will be appreciated by those skilled in the art that the second channel of the multi-picture processor 10, and both channels of the multi-picture processor 8 may still operate in the normal mode of operation, and hence cause any sequence of images to be displayed in any screen format on the monitors M12, M21 and M22.

Figure 4A:
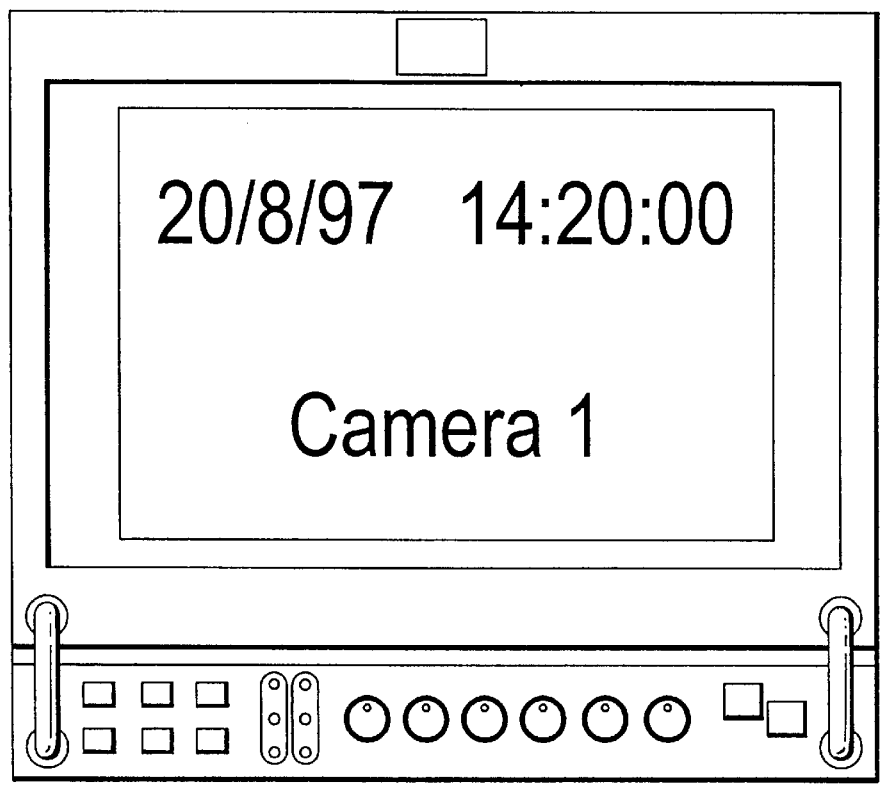
FIGS. 4A to 4F show display configurations used in preferred embodiments to display images associated with alarm signals.

In preferred embodiments of the present invention, the multi-picture processor 6 controls the circuit 18 and the frame store 20 to automatically change the multi-screen display format dependent on the number of images associated with alarm signals that need to be displayed, so that up to a maximum of 8 images may be displayed simultaneously on the monitor M11. Further, as the number of active alarms detected by the system changes, then the multi-picture processor 6 automatically adjusts the multi-screen display format so that only video sources associated with active alarms are displayed. For example, with reference to FIG. 4A, if only one video source is associated with the alarm(s) received by the system controller 2, then this image is displayed as a full screen image on the monitor M11. In preferred embodiments, a border associated with the image will also be highlighted, for example by the border being a flashing red border, to signify the alarm condition.

Figure 4B:
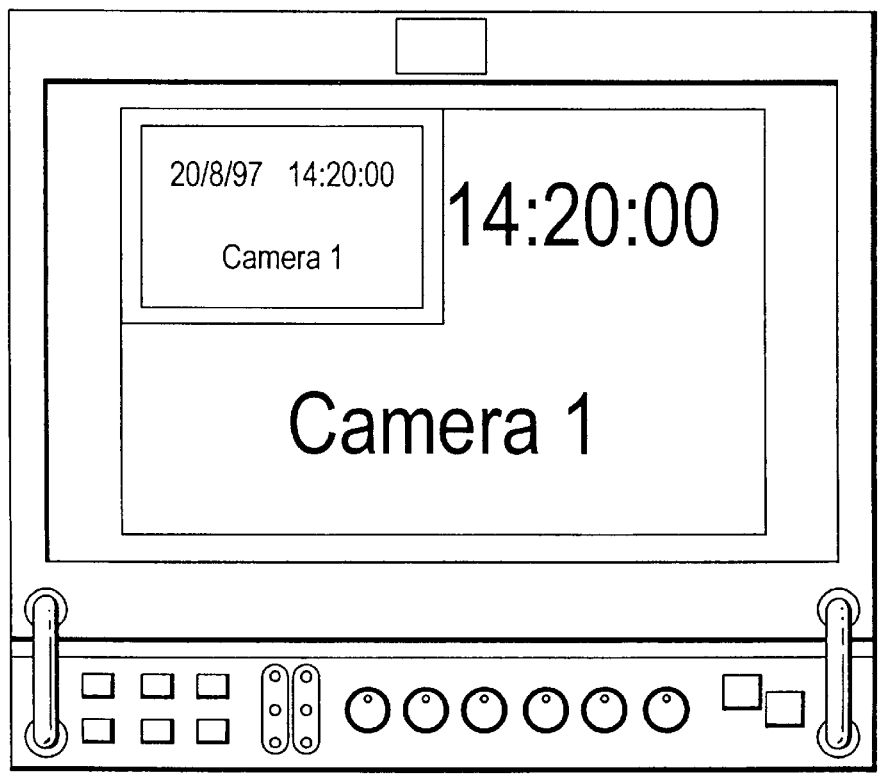
Figure 4C:
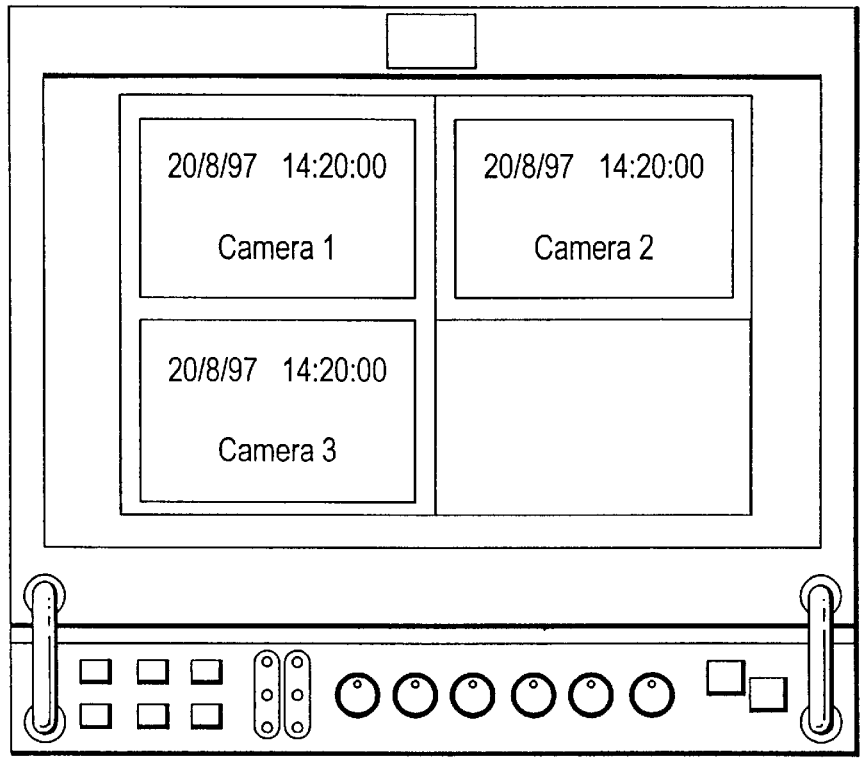

If two video sources are associated with the alarm signals received over path 130 at the system controller 2, then these two images are preferably displayed as a quarter size picture-in-picture display, as illustrated in FIG. 4B. Again in preferred embodiments, both the full screen border and the quarter size sub-picture border will be highlighted to illustrated the alarm condition. As illustrated in FIG. 4B, the quarter size sub-picture may initially be displayed in the top left quadrant of the display. However, it is intended that the operator will be able to move that image via any of the control panels CP1 to CP8. In preferred embodiments, if three to four images associated with alarm signals are to be displayed, then this is preferably achieved by a "quad split" of the display area of the monitor M11. FIG. 4C illustrates this approach, in the instance that three images are to be displayed. Again, the border colour for each displayed image can be highlighted, for example by having the border flash in red, to signify active alarm conditions. As illustrated in FIG. 4C, if only three images are to be displayed, then the fourth display location will preferably be black.

Figure 4D:
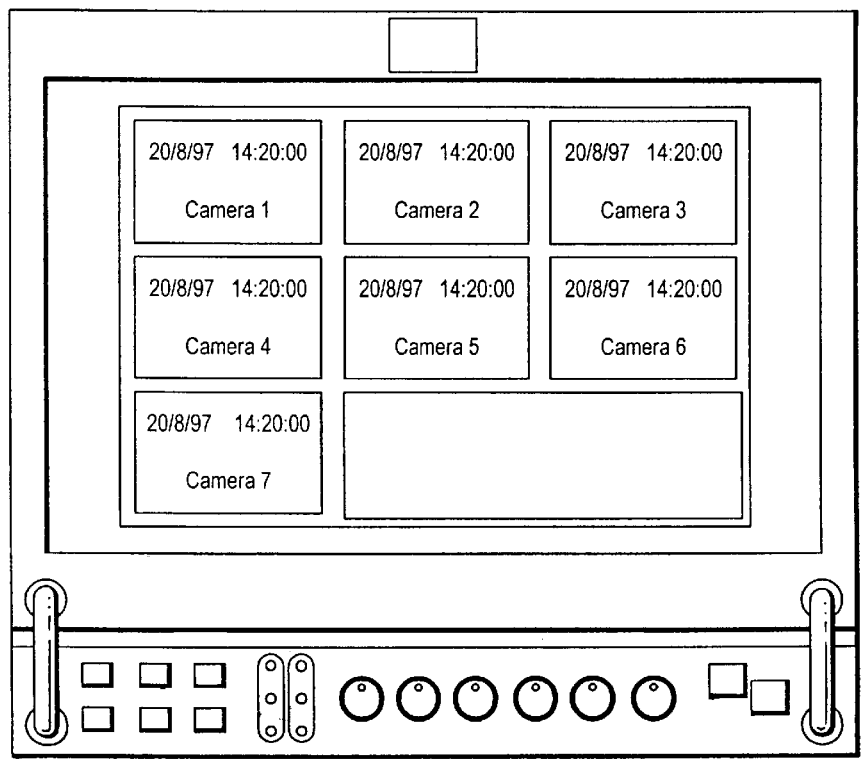

If the alarm signals received over path 130 are associated by the programmable controller 4 with between five and eight video sources, then the corresponding images from those video sources will be displayed in an 8-way split screen format in preferred embodiments. This is illustrated in FIG. 4D. Only video sources associated with active alarms will in preferred embodiments be displayed, and any unused display location in the 8 way split will preferably be black. Again, each displayed image border can be made to flash in red in order to signify an active alarm condition.

Figure 4E:
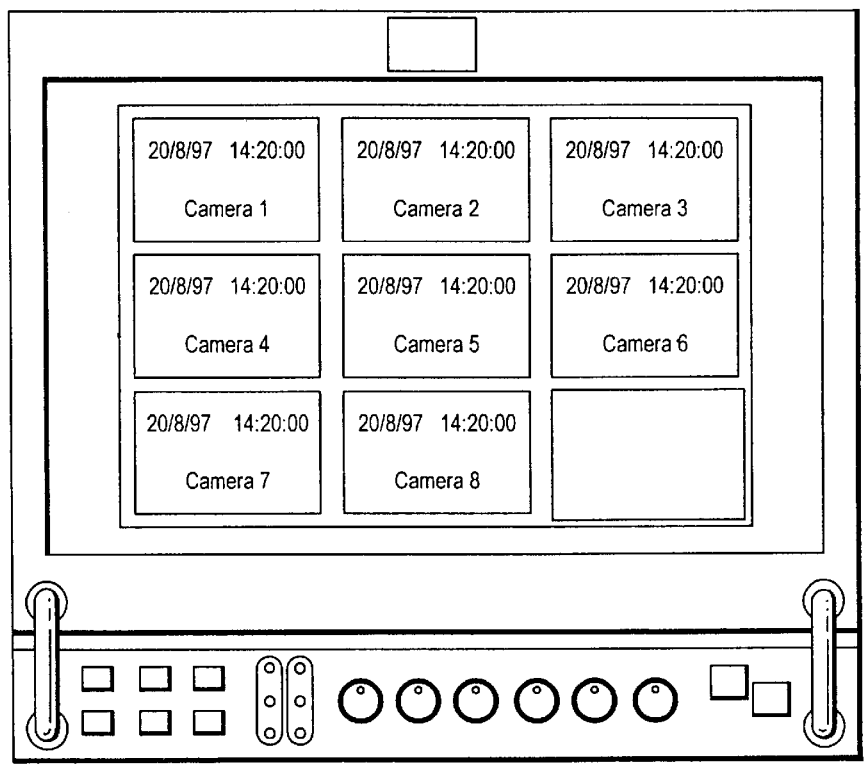
Figure 4F:
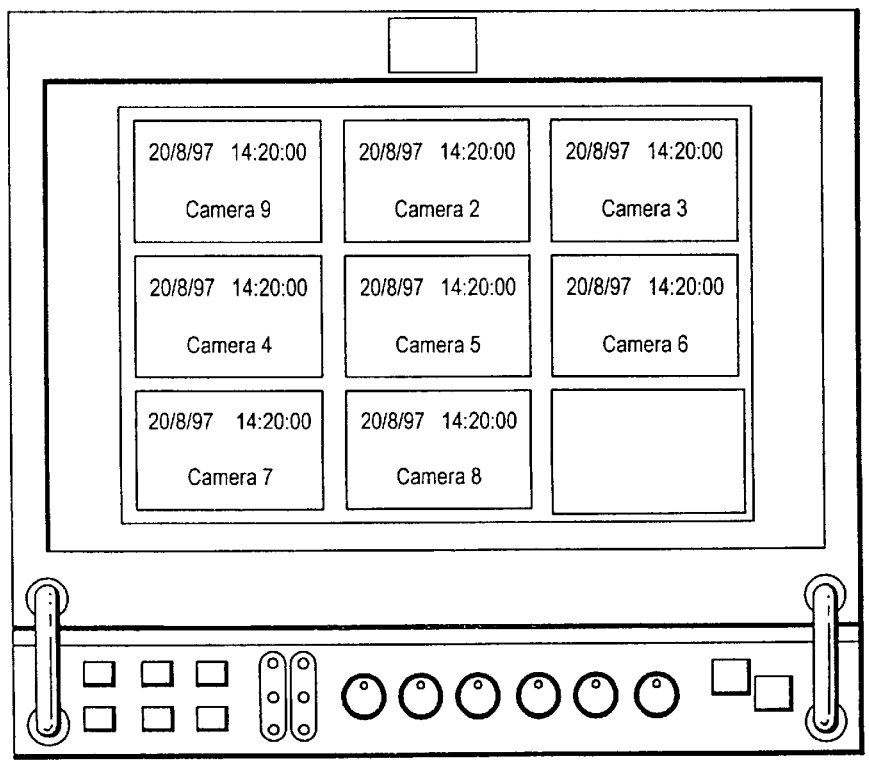

If more that eight video sources are associated with the alarm signals received over path 130, then only eight images will initially be displayed. However, as the operator clears particular alarm conditions, and hence removes the requirement to display the image associated with that alarm condition, then new images associated with other alarm conditions will be displayed instead. Hence, if an existing alarm condition is cleared, then the image associated with the cleared alarm will be replaced by a new image that is associated with an active alarm condition. Hence, as illustrated in FIG. 4E, if nine images are associated with the active alarm conditions, then the first eight images are shown in an 8-way split format on the monitor M11. However, if the alarm condition associated with image 1 is subsequently cleared by the operator, then that image is replaced by the image associated with alarm condition 9, as illustrated in FIG. 4F.

As alarm conditions are cleared by the operator, then the screen format is automatically changed so that only active alarms are displayed. For example, if five images are currently displayed in an 8-way split format, and the alarm condition associated with one of those images is subsequently cleared, then the multi-picture processor 6 will show the remaining four images as a quad split display. Similarly, if three images are displayed, and the alarm condition associated with one is cleared, then the remaining two images are preferably displayed in a picture-in-picture format.

In preferred embodiments, the multi-picture processor 6 may also be arranged to output an alarm control signal to a VCR, this signal being used by the VCR to record the video images output by the multi-picture processor 6 to the monitor M11.

When all alarm conditions have been cleared from the system, the programmable controller 4 reverts to its normal mode of operation, and the multi-picture processors 10, 12 are then arranged to display images on the four monitors M11, M12, M21, M22 under the control of the programmable controller 4, which in its normal mode of operation may, for example, sequence through the various images from the various video sources over a predetermined period of time.

In preferred embodiments, at least one of the video sources is connected to a mechanism, such as a pan and tilt head, for moving the video source relative to a surface on which it is mounted, and the system controller is responsive to specific alarm signals to output signals to the mechanism in order to move the at least one video source in a predetermined manner. Hence, if a camera is being used to monitor a particular room, then the occurrence of a specific set of alarm signals, for example alarm signals generated from a particular area of the room, may cause the system controller to output signals to the mechanism in order to move the video source such that it displays an image from that particular area of the room. Hence, in preferred embodiments, the security control system can automatically move, zoom and focus a camera and display the result of a video image on a monitor in response to the detection of one or more alarm signals. This further enhances the information made available to the operator, and hence assists the operator to take effective action in response to the alarm condition(s).

From the above description, it is apparent that the security control system of preferred embodiments of the present invention is arranged to process images associated with alarm signals in a manner which facilitates more effective use of the available information by an operator. Images associated with alarm signals are directed to a predefined area of the display means, preferably this predefined area being one monitor from a selection of monitors that may be used to display images. Further, scaling is used to ensure that up to a predetermined maximum number of images associated with alarm signals are displayed simultaneously on that display monitor. By this approach, the display of alarm information is fully automated, thereby facilitating more efficient and effective use of the information made available by the security control system.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A security control system comprising:

a system controller for receiving a plurality of video and alarm signals from a plurality of sources, each said alarm signal being associated with a respective video signal; and for selectively outputting a subset of the received video signals in response to receipt of said alarm signals, said subset comprised of the video signals corresponding to said alarm signals;

a display controller for receiving said subset of video signals output by said system controller, for processing said subset of video signals into images for display on a display means, for causing said images to be displayed in a predetermined area of said display means corresponding to said alarm signals, and to scale said images depending on the number of such images, such that those images can be displayed simultaneously within said predetermined area of the display means; and a display means for displaying said plurality of video signals having at least one display device containing the predetermined areas for displaying said images output from said display controller in response to said alarm signals.

2. A security control system as claimed in claim 1, wherein the display controller is arranged to display simultaneously up to a predetermined maximum number of images generated from the video signals associated with alarm signals.

3. A security control system as claimed in claim 2, wherein if the number of images generated from the video signals associated with alarm signals exceeds the predetermined maximum number, then the excess images are displayed in the predetermined area when alarm conditions associated with previously displayed images are cleared by an operator.

4. A security control system as claimed in claim 2, wherein the images generated from video signals associated with alarm signals are displayed in a picture-in-picture format within the predetermined area of the display means.

5. A security control system as claimed in claim 2, wherein the images generated from video signals associated with alarm signals are displayed as an array within the predetermined area of the display means.

6. A security control system as claimed in claim 1, wherein a visual indication is associated with each displayed image generated from video signals associated with alarm signals to indicate to an operator that those images are associated with alarm signals.

7. A security control system as claimed in claim 6, wherein a border of each displayed image associated with alarm signals is highlighted to provide the visual indication.

8. A security control system as claimed in claim 7, wherein the highlighted border takes the form of a flashing border.

9. A security control system as claimed in claim 1, wherein the system controller includes a storage for identifying the video source associated with each alarm signal, and the system controller is arranged to reference this storage upon receipt of an alarm signal to determine which video signal to output to the display controller.

10. A security control system as claimed in claim 1, wherein the number of alarm signal inputs to the control system exceeds the number of video sources, and at least one of said video sources is associated with a plurality of alarm signal inputs.

11. A security control system as claimed in claim 1, wherein at least one of the video sources is connected to a mechanism for moving the video source relative to a surface on which it is mounted, and the system controller is responsive to specific alarm signals to output signals to the mechanism in order to move the at least one video source in a predetermined manner.

12. A method of operating a security control system, comprising the steps of:
- (a) receiving video signals from a plurality of video sources;
- (b) selectively outputting a subset of the received video signals for display on a display means;
- (c) processing the signals output at said step (b) to generate images for display on the display means;
- (d) receiving alarm signals, each alarm signal being associated with a video source;
- (e) responsive to receipt of an alarm signal, outputting at step (b) the video signal of the associated video source;
- (f) scaling said images generated at step (c) from video signals associated with alarm signals depending on the number of said images, so that said images are displayed simultaneously in a predetermined area of the display means; and
- (g) displaying said subset of said images on said display means, said display means comprised of at least one display device containing the predetermined area for displaying said images.

* * * * *